United States Patent
Marcu et al.

(10) Patent No.: US 7,620,538 B2
(45) Date of Patent: Nov. 17, 2009

(54) CONSTRUCTING A TRANSLATION LEXICON FROM COMPARABLE, NON-PARALLEL CORPORA

(75) Inventors: Daniel Marcu, Hermosa Beach, CA (US); Kevin Knight, Hermosa Beach, CA (US); Dragos Stefan Munteanu, Los Angeles, CA (US); Philipp Koehn, Venice, CA (US)

(73) Assignee: University of Southern California, Los Angeles, CA (US)

( * ) Notice: Subject to any disclaimer, the term of this patent is extended or adjusted under 35 U.S.C. 154(b) by 793 days.

(21) Appl. No.: 10/401,124

(22) Filed: Mar. 26, 2003

(65) Prior Publication Data

US 2003/0204400 A1    Oct. 30, 2003

Related U.S. Application Data

(60) Provisional application No. 60/368,070, filed on Mar. 26, 2002, provisional application No. 60/368,447, filed on Mar. 27, 2002.

(51) Int. Cl.
*G06F 17/28* (2006.01)
(52) U.S. Cl. .................. 704/2; 704/7; 704/8; 704/10
(58) Field of Classification Search .............. 704/2, 704/10, 7, 8
See application file for complete search history.

(56) References Cited

U.S. PATENT DOCUMENTS

| | | | | |
|---|---|---|---|---|
| 4,599,691 A | * | 7/1986 | Sakaki et al. | 704/2 |
| 4,942,526 A | * | 7/1990 | Okajima et al. | 704/10 |
| 5,167,504 A | * | 12/1992 | Mann | 434/157 |
| 5,181,163 A | * | 1/1993 | Nakajima et al. | 704/10 |
| 5,696,980 A | * | 12/1997 | Brew | 704/273 |
| 5,893,134 A | * | 4/1999 | O'Donoghue et al. | 715/264 |
| 6,904,402 B1 | * | 6/2005 | Wang et al. | 704/10 |

OTHER PUBLICATIONS

Reinhard Rapp "Automatic identification of Word Translations from Unrelated English and German Corpora", 37th Annual Meeting on the Association for Computational Linguistics, Jun. 1999, pp. 519-526.*

I. Dan Melamed "Automatic Evaluation and Uniform Filter Cascades for Inducing N-Best Translation Lexicons", ACL Proceedings of the 3rd Workshop on Very Large Corpora, 1995, pp. 184-198.*

Pascale Fung and Lo Yuen Yee, "An IR Approach for Translating New Words from nonparallel, Comparable Texts", 36th Annual Meeting on the Association for Comuptational Linguistics, 17th International Conference on Computational Linguistics, 1998 pp. 414-420.*

(Continued)

*Primary Examiner*—David R Hudspeth
*Assistant Examiner*—Jakieda R Jackson
(74) *Attorney, Agent, or Firm*—Carr & Ferrell LLP (57) ABSTRACT

A machine translation system may use non-parallel monolingual corpora to generate a translation lexicon. The system may identify identically spelled words in the two corpora, and use them as a seed lexicon. The system may use various clues, e.g., context and frequency, to identify and score other possible translation pairs, using the seed lexicon as a basis. An alternative system may use a small bilingual lexicon in addition to non-parallel corpora to learn translations of unknown words and to generate a parallel corpus.

6 Claims, 9 Drawing Sheets

OTHER PUBLICATIONS

Reinhard Rapp, "Identfying Word Translation in non-Paralel Texts", 33rd Anual Meeting for the Association for Computational Linguistics, 1995, pp. 320-322.*

Pascale Fung "Compiling Bilingual Lexicon Entries from a Non-Parallel English-Chinese Corpus", Proceedings of the 3rd Workshop on Very Large Corpora, Boston Mass, 1995, pp. 173-183.*

William Gale and Kenneth Church "A Program for Aligning Sentences in Bilingual Corpora", 29th Annual Meeting on Association for Computational Linguistics, 1991, pp. 177-183.*

Gale et al, "A Program for Aligning Sentences in Bilingual Corpora", Computational Linguistics, 1993, 19(1).*

Cheung et al "Sentence Alignment in Parallel, Comparable, and Quasi-comparable Corpora", In Proceedings of LREC, 2004, pp. 30-33.*

Varga et al, "Parallel corpora for medium density languages", In Proceedings of RANLP 2005, pp. 590-596.*

Fung et al, "Mining Very-non-parallel corpora: Parallel sentence and lexicon extraction via bootstrapping and EM", In EMNLP 2004.*

Gaussier et al, "A Geometric View on Bilingual Lexicon Extraction from Comparable Corpora", In Proceedings of ACL 2004, july.*

Grossi et al, "Suffix Trees and their applications in string algorithms", In. Proceedings of the $1^{st}$ South American Workshop on String Processing, Sep. 1993, pp. 57-76.*

Covington, "An Algorithm to Align Words for Historical Comparison", Computational Linguistics, 1996, 22(4), pp. 481-496.*

Diab, et al., "A Statistical Word-Level Translation Model for Comparable Corpora", RIAO Conference 2000, URL:http://www.umiacs.umd.edu/~mdiab/Papers/RIAO.pdf.

Tiedemann, "Automatic Construction of Weighted String Similarity Measures", *Joint Sigdat Conf. on Empirical Methods in Natural Language Processing and Very Large Corpora*, Jun. 21, 1999, URL:http://acl.ldc.upenn.edu/W/W99/W99-0626.pdf.

G. Mann, D. Yarowsky, "Multipath Translation Lexicon Induction via Bridge Languages", *Proceedings of the Second Conference of the North American Chapter of the Association for Computational Linguistics*, Pittsburgh, PA, 2001, URL:http://www.cs.jhu.edu/.

* cited by examiner

| Clues | Entries | Corpus |
|---|---|---|
| Spelling | 140 | 25.4% |
| Context | 107 | 31.9% |
| Preserving Similarity | 2 | 15.8% |
| Frequency | 2 | 17.0% |
| Spelling+Context | 185 | 38.6% |
| Spelling+Frequency | 151 | 27.4% |
| Spelling+Context+Similarity | 186 | 39.0% |
| All clues | 186 | 39.0% |

1. Build the forward and backward BSTs.
2. Traverse each BST and extract left
   and right alignments for every node
   that represents a divergence
   For each word pair from the divergence set:
       a. create context alignments out of
          appropriate left and right alignments
       b. filter out invalid context alignments
       c. extract valid translation candidates
          from the context alignments

CONSTRUCTING A TRANSLATION LEXICON FROM COMPARABLE, NON-PARALLEL CORPORA

CROSS-REFERENCE TO RELATED APPLICATIONS

This application claims priority to U.S. Provisional Application Ser. No. 60/368,070, filed on Mar. 26, 2002, and U.S. Provisional Application Ser. No. 60/368,447, filed on Mar. 27, 2002, the disclosures of which are incorporated by reference.

ORIGIN OF INVENTION

The research and development described in this application were supported by DARPA under grant number N66001-00-1-8914. The U.S. Government may have certain rights in the claimed inventions.

BACKGROUND

Machine translation (MT) concerns the automatic translation of natural language sentences from a first language (e.g., French) into another language (e.g., English). Systems that perform MT techniques are said to "decode" the source language into the target language.

Roughly speaking, statistical machine translation (SMT) divides the task of translation into two steps: a word-level translation model and a model for word reordering during the translation process. The statistical models may be trained on parallel corpora. Parallel corpora contain large amounts of text in one language along with their translation in another. Unfortunately, such corpora are available only in limited amounts and cover only in specific genres (Canadian politics, Hong Kong laws, etc). However, monolingual texts exist in higher quantities and in many domains and languages. The availability of monolingual corpora has been enhanced greatly due to the digital revolution and wide-spread use of the World Wide Web. Methods for processing such resources can therefore greatly benefit the field.

SUMMARY

In an embodiment, a system may be able to build a translation lexicon from comparable, non-parallel corpora. The system may identify all identically spelled words in the corpora and use these as a seed lexicon for other processes based on clues indicating possible translations.

In another embodiment, a system may align text segments in comparable, non-parallel corpora, matching strings in the corpora, and using the matched strings to build a parallel corpus. The system may build a Bilingual Suffix Tree (BST) and traverse edges of the BST to identify matched strings. The BST may also identify potential translations based on words in the corpora between matched strings.

DETAILED DESCRIPTION

Figure 1:
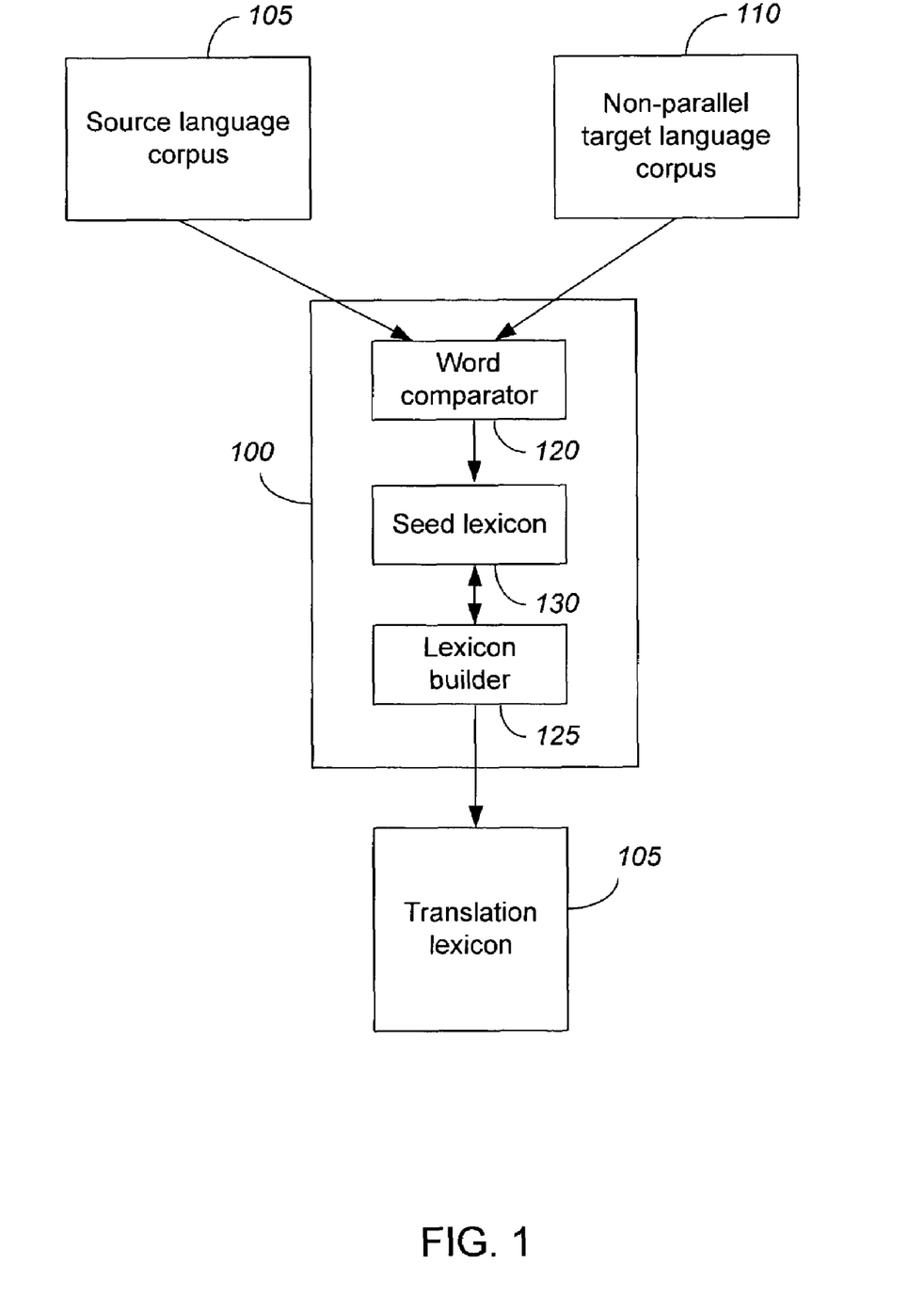
FIG. 1 is a block diagram of a system for building a translation lexicon according to an embodiment.

FIG. 1 shows a system 100 for building a translation lexicon 105 according to an embodiment. The system may use non-parallel monolingual corpora 110, 115 in two languages to automatically generate one-to-one mapping of words in the two languages.

The two monolingual corpora should be in a fairly comparable domain. For example, in an implementation, an English-German translation lexicon was generated from a 1990-1992 Wall Street Journal corpus on the English side and a 1995-1996 German news wire (DPA) on the German side. Both corpora are news sources in the general sense. However, they span different time periods and have a different orientation: the World Street Journal covers mostly business news, the German news wire mostly German politics.

The system 100 may use clues to find translations of words in the monolingual corpora. The first clue considered may be the existence of identical words in the two corpora. Due to cultural exchange, a large number of words that originate in one language may be adopted by others. Recently, this phenomenon can be seen with words such as "Internet" or "Aids". These terms may be adopted verbatim or changed by well-established rules. For instance, "immigration" (German and English) has the Portuguese translation "immigração", as many words ending in -tion have translations with the same spelling except for the ending changed to -ção.

Figure 2:
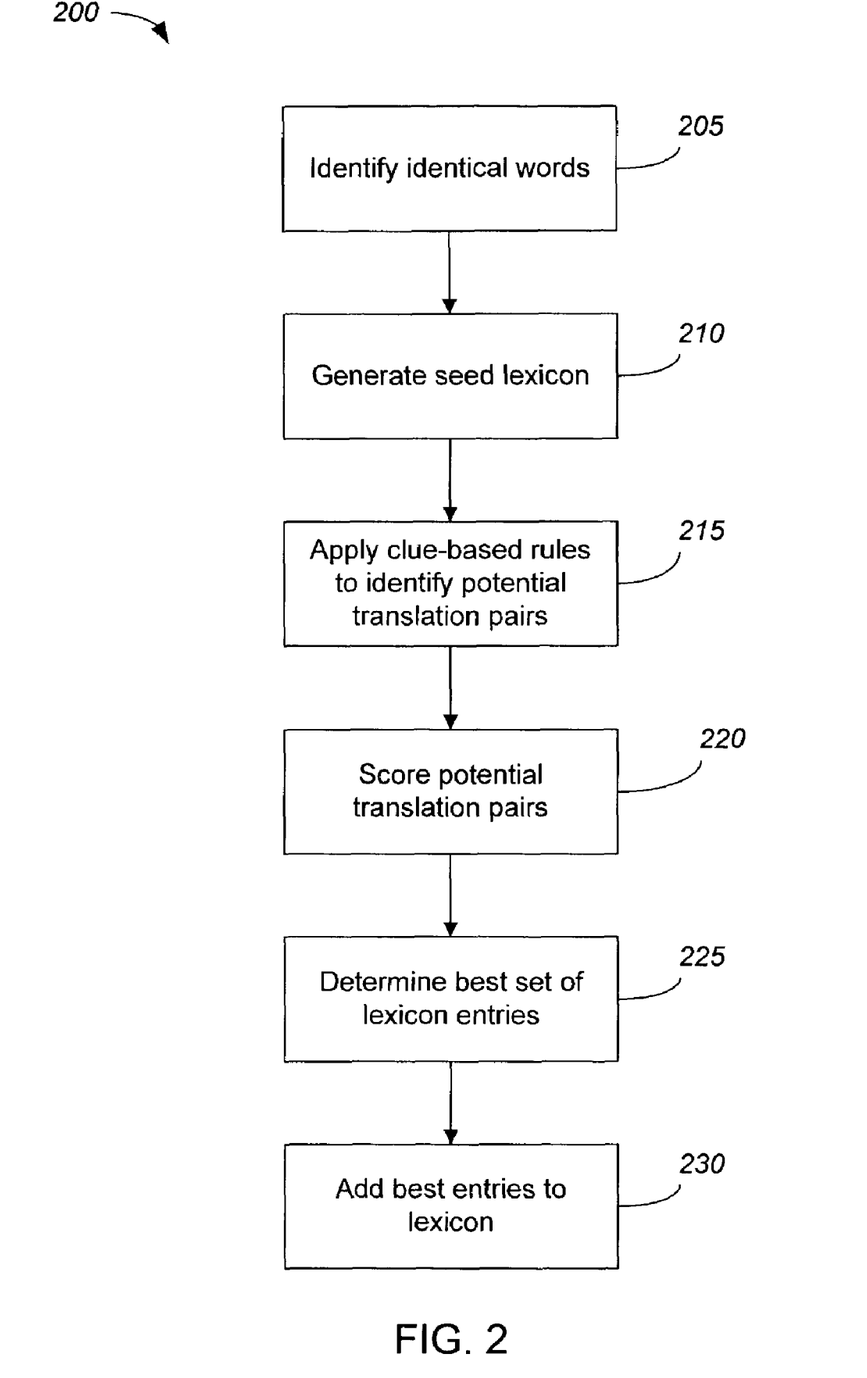
FIG. 2 is a flowchart describing a method for building a translation lexicon from non-parallel corpora.

FIG. 2 shows a flowchart describing a method 200 for building a translation lexicon from non-parallel corpora. A word comparator 120 may be used to collect pairs of identical words (block 205). In the English-German implementation described above, 977 identical words were found. When checked against a benchmark lexicon, the mappings were found to be 88% correct.

The correctness of word mappings acquired in this fashion may depend highly on word length. While identical three-letter words were only translations of each other 60% of the time, this was true for 98% of ten-letter words. Clearly, for shorter words, the accidental existence of an identically spelled word in the other language word is much higher. Accordingly, the word comparator 120 may restrict the word length to be able to increase the accuracy of the collected word pairs. For instance, by relying only on words at least of length six, 622 word pairs were collected with 96% accuracy.

The identified identically spelled word pairs may be used as a seed lexicon 130 (block 210). A lexicon builder 125 may expand the seed lexicon into the larger translation lexicon 105 by applying rules based on clues which indicate probable translations. The lexicon builder 125 may use seed lexicon to bootstrap these methods, using the word pairs in the seed lexicon as correct translations.

As already mentioned, there are some well-established transformation rules for the adoption of words from a foreign language. For German to English, this includes replacing the letters k and z by c and changing the ending -tät to -ty. Both these rules can be observed in the word pair Elektrizität and electricity. The lexicon builder 125 may utilize these rules to expand the seed lexicon. In the English-German implementation, 363 additional word pairs were collected, with an accuracy of 91%.

The lexicon builder 125 extracts potential translation word pairs based on one or more clues. These clues may include similar spelling, similar context, preserving word similarity, and word frequency.

When words are adopted into another language, their spelling might change slightly in a manner that cannot be simply generalized in a rule, e.g., "website" and "Webseite". This is even more the case for words that can be traced back to common language roots, such as "friend" and "Freund", or "president" and "Präsident". Still, these words, often called "cognates", maintain a very similar spelling. This can be defined as differing in very few letters. This measurement can be formalized as the number of letters common in sequence between the two words, divided by the length of the longer word.

The example word pair "friend" and "freund" shares 5 letters (fr-e-nd), and both words have length 6, hence their spelling similarity is 5/6, or 0.83. This measurement may be referred to as the "longest common subsequence ratio." The lexicon builder 125 may measure the spelling similarity between every German and English word, and sort possible word pairs accordingly. This may be done in a greedy fashion, i.e., once a word is assigned to a word pair, the lexicon builder 125 does not look for another match.

Another clue is context. If the monolingual corpora are somewhat comparable, it can be assumed that a word that occurs in a certain context should have a translation that occurs in a similar context. The context may be defined by the frequencies of context words in surrounding positions. This context has to be translated into the other language, and the lexicon builder 125 can search the word with the most similar context.

The lexicon builder 125 may collect counts over words occurring in an n-word window, e.g., four words (n=4), around the target word. For each occurrence of a target word, the counts may be collected over how often certain context words occur in the two positions directly ahead of the target word and the two following positions. The counts may be collected separately for each position and then entered into a context vector with a dimension for each context word in each position. Finally, the raw counts are normalized. Vector comparison is done by adding all absolute differences of all components.

Alternatively, the lexicon builder 125 may count how often another word occurs in the same sentence as the target word. The counts may then be normalized by a using the tf/idf method, which is often used in information retrieval.

The seed lexicon may be used to construct context vectors that contain information about how a new unmapped word co-occurs with the seed words. This vector can be translated into the other language, since we already know the translations of the seed words are already known. The lexicon builder 125 can search for the best matching context vector in the target language, and decide upon the corresponding word to construct a word mapping. The lexicon builder 125 may compute all possible word, or context vector, matches. The best word matches may be collected in a greedy fashion.

Another clue is based on the assumption that pairs of words that are similar in one language should have translations that are similar in the other language. For instance, Wednesday is similar to Thursday as Mittwoch is similar to Donnerstag. Two words may be defined as similar if they occur in a similar context, which is the case for Wednesday and Thursday.

In one approach, the context vector for each word in the lexicon may consist of co-occurrence counts in respect to a number of peripheral tokens (basically, the most frequent words). These counts may be collected for each position in an n-word window around the word in focus.

Instead of comparing the co-occurrence counts directly, the Spearman rank order correlation may be applied. For each position, the tokens are compared in frequency and the frequency count is replaced by the frequency rank, e.g., the most frequent token count is replaced with 1 and the least frequent by n. The similarity of the two context vectors $a=(a_i)$ and $b=(b_i)$ is then defined by:

$$R(a, b) = 1 - \frac{6 \sum (a_i - b_i)}{4n(n^2 - 1)}$$

The result is a matrix with similarity scores between all German words, and a second matrix with similarity scores between all English words. For a new word, the lexicon builder 125 may look up its similarity scores to seed words, thus creating a similarity vector. Such a vector can be translated into the other language. The translated vector can be compared to other vectors in the second language.

The lexicon builder 125 may perform a greedy search for the best matching similarity vectors sand add the corresponding words to the lexicon.

Another clue is based on the assumption that in comparable corpora, the same concepts should occur with similar frequencies. Frequency may be defined as a ratio of the word frequencies normalized by the corpus sizes.

Each of the clues provides a matching score between two words (block 220), e.g., a German word and an English word. The likelihood of these two words being actual translations of each other may correlate to these scores. The lexicon builder 125 may employ a greedy search to determine the best set of lexicon entries based on these scores (block 225). First, the lexicon builder 125 searches for the highest score for any word pair. This is added to the lexicon (block 230), and word pairs that include either the German and English word are dropped from further search. This may be performed iteratively until all words are used up.

The lexicon builder 125 may combine different clues by adding up the matching scores. The scores can be weighted. For example, when using the spelling clue in combination with others, it may be useful to define a cutoff. If two words agree in 30% of their letters, this is generally as bad as if they do not agree in any, i.e., the agreements are purely coincidental.

Figure 3:
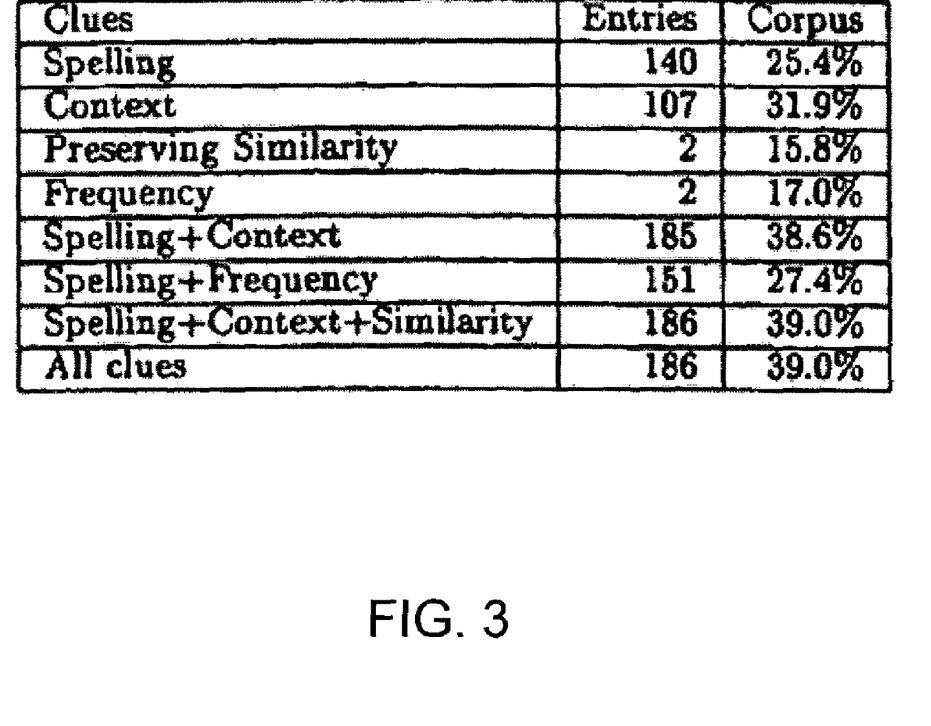
FIG. 3 is a table showing results of an experiment utilizing the system of FIG. 1.

FIG. 3 shows results of the English-German implementation. "Entries" indicate the number of correct lexicon entries that were added to a seed lexicon of 1337 identically spelled words, and "Corpus" indicates how well the resulting translation lexicon performs compared to the actual word-level translations in a parallel corpus.

The English-German implementation was restricted to nouns. Verbs, adjectives, adverbs and other part of speech may be handled in a similar way. They might also provide useful context information that is beneficial to building a noun lexicon. These methods may be also useful given a different starting point. For example, when building machine translation systems, some small parallel text should be available. From these, some high-quality lexical entries can be learned, but there will always be many words that are missing. These may be learned using the described methods.

Figure 4:
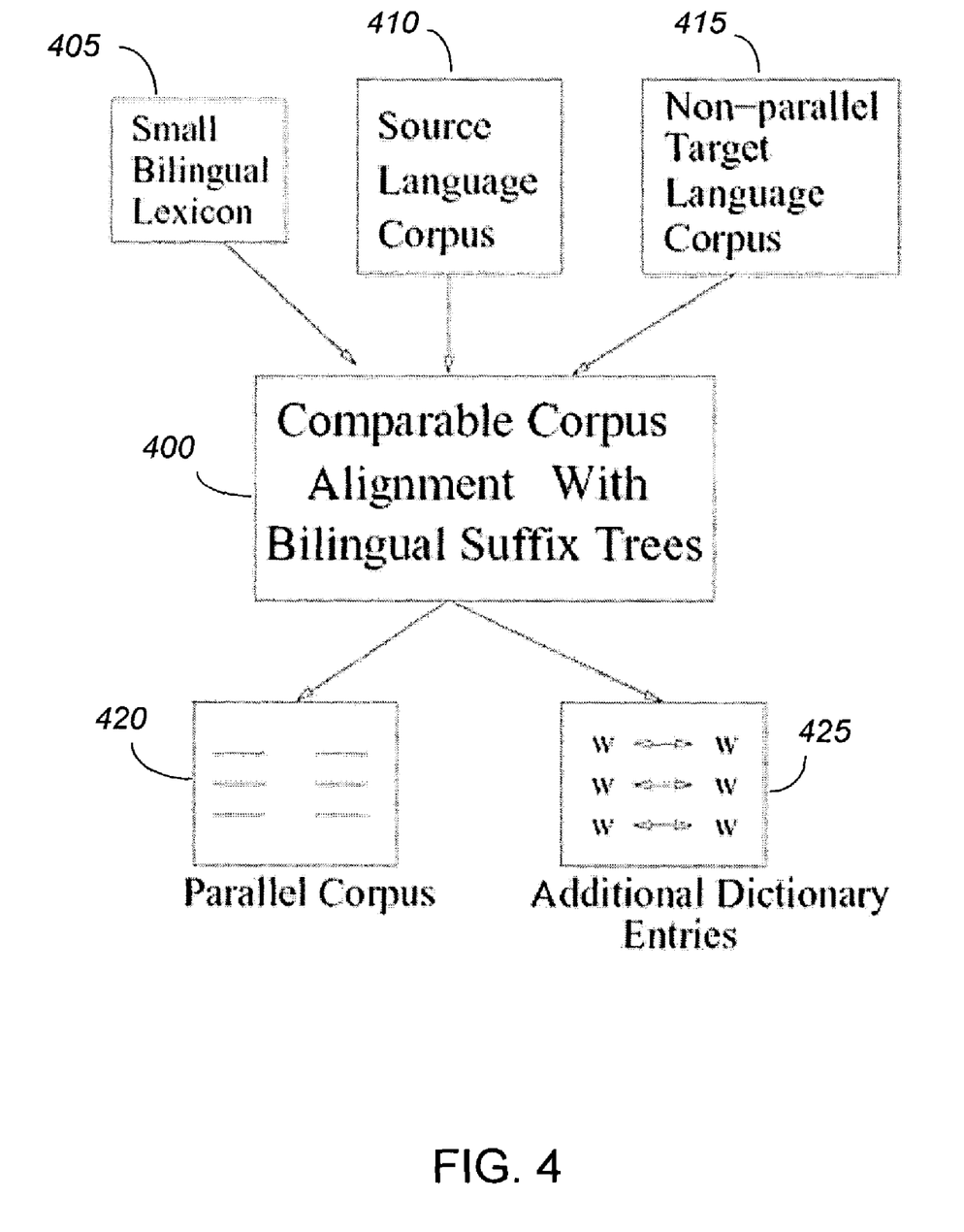
FIG. 4 is a block diagram of a system for building a translation lexicon according to another embodiment.

FIG. 4 shows a system 400 for building a translation lexicon according to another embodiment. The system 400 may also be used to build parallel corpora from comparable corpora. Given an initial bilingual lexicon 405 and two texts 410, 415 in each of the languages, the system 400 may identify parts of the texts which can be aligned (i.e., are mutual translations of each other according to the lexicon). The parts can be arbitrarily long, i.e., the system 400 may align sequences of a few words rather than or in addition to whole sentences or whole phrases. Based on these alignments, the system 400 may generate a parallel corpus 420 and identify translations 425 of words from the source language which are not in the lexicon.

For example, consider the following two sentences where the only unknown French word is "raison":

"Ce est pour cette raison que le initiative de le ministre . . . "; and

"It is for this reason that the party has proposed . . . "

Since "Ce est pour cette" can be aligned with "It is for this" and "que le" with "that the", it is a reasonable assumption that "raison" can be translated by "reason". The system 400 may search the corpora for cases similar to this example.

The system 400 may use a suffix tree data structure in order to identify the alignments. The suffix tree of a string uniquely encodes all the suffixes of that string (and thus, implicitly, all its substrings too). The system 400 may first build such a tree of the target language corpus, and then add to each substrings all the substrings from the source language corpus that align to it. The next step is to identify unknown target language words that are surrounded by aligned substrings. The source language word that corresponds to the "well-aligned" unknown is considered to be a possible translation.

A suffix tree stores in linear space all suffixes of a given string. Such succinct encoding exposes the internal structure of the string, providing efficient (usually linear-time) solutions for many complex string problems, such as exact and approximate string matching, finding the longest common substring of multiple strings, and string compression. Formally, a suffix tree for a string S of length N has the following properties: each edge of the tree is labeled by a nonempty substring of S; each internal node other than the root has at least two children; no two edges out of a node can have edge-labels beginning with the same character/word; and (the key feature of the tree) there is a one-to-one correspondence between all suffixes of S and paths in the tree from the root to the leaves.

Figure 5:
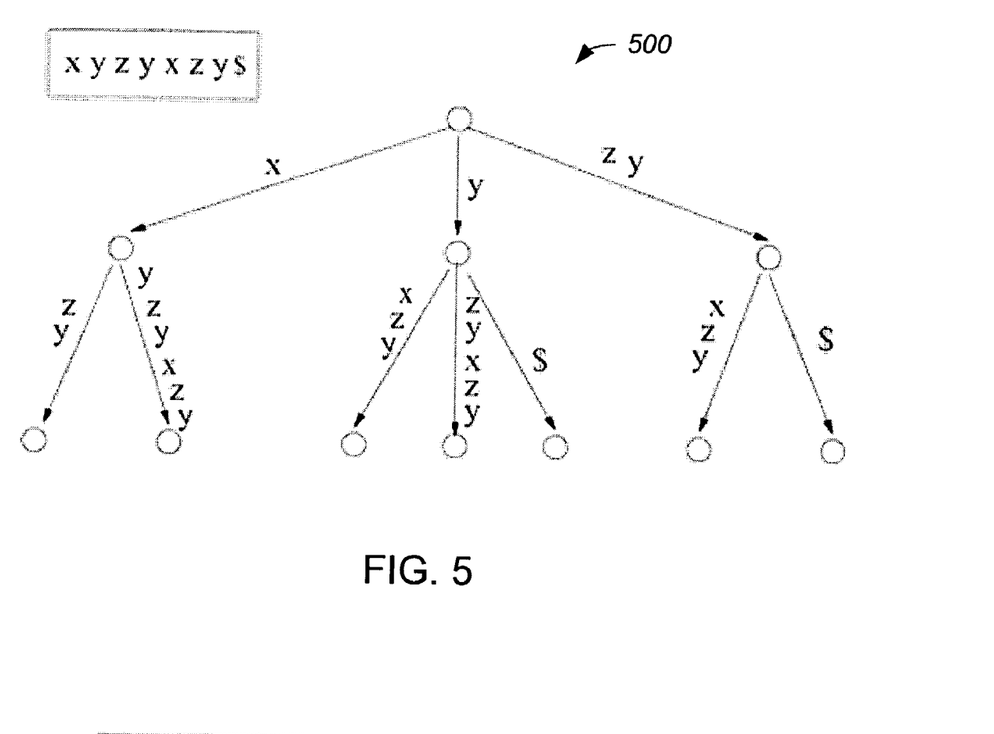
FIG. 5 is a suffix tree.

FIG. 5 shows the suffix tree 500 of string xyzyxzy. Note that if a suffix of a string is also a prefix of another suffix (as would be the case for suffix zy of string xyzyxzy), a proper suffix tree cannot be built for the string. The problem is that the path corresponding to that suffix would not end at a leaf, so the tree cannot have the last property in the list above. To avoid this, the system 400 appends an end-of-string marker "$" that appears nowhere else in the string. For clarity, the drawings only show the $ marker when necessary.

Figure 6:
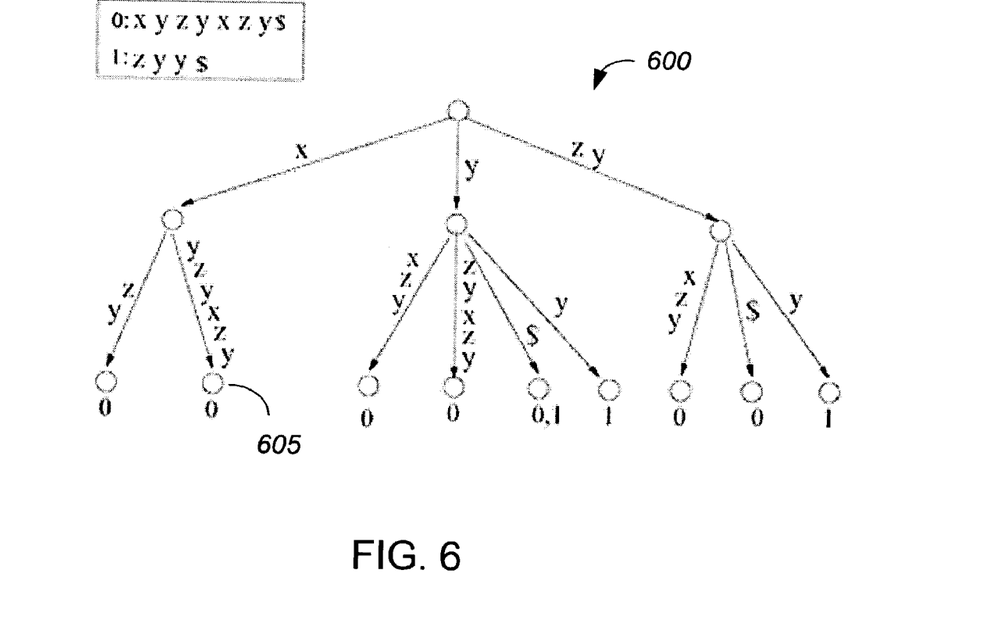
FIG. 6 is a Generalized Suffix Tree (GST).

Each monolingual corpus given as input to the system 400 may be divided into a set of sentences. The system 400 may use a variant of suffix trees that works with sets of strings, namely Generalized Suffix Trees (GST). In a GST of a set of strings, each path from the root to a leaf represents a suffix in one or more strings from the set. A conceptually easy way to build such a tree is to start by building a regular suffix tree for the first sentence in the corpus, and then for each of the other sentences to take their suffixes one by one and add them to the tree (if they are not already in it). FIG. 6 shows the GST 600 for a corpus of two sentences. The numbers at the leaves 605 of the tree show which sentences contain the suffix that ends there.

Building the suffix tree of a string takes time and space linear in the length of the string. Building a GST for a set of strings takes time and space linear in the sum of the lengths of all strings in the set.

Figure 7:
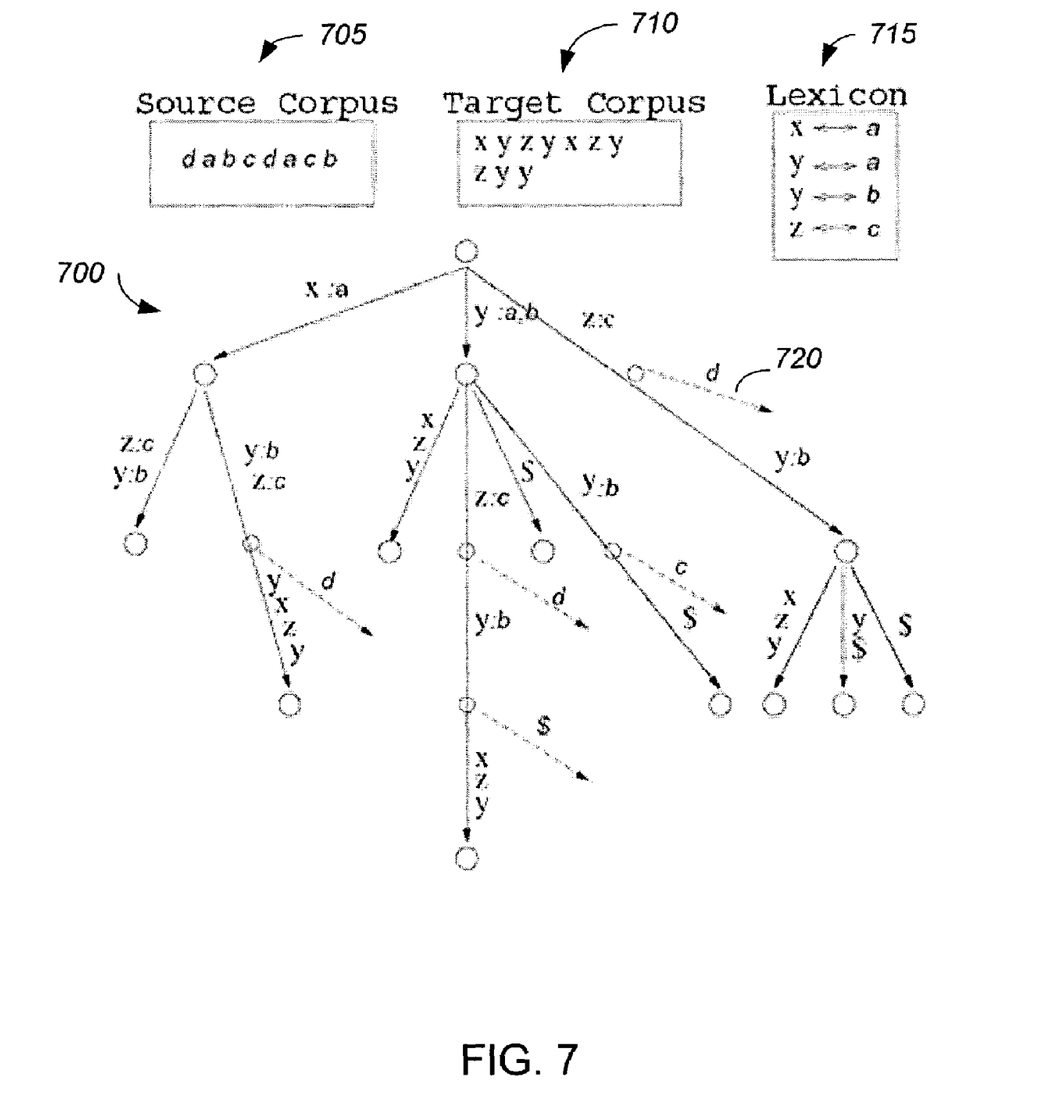
FIG. 7 is a Bilingual Suffix Tree (BST).

A Bilingual Suffix Tree (BST) is the result of matching a source language GST against a target language GST. Two strings (i.e., sequences of words) match if the corresponding words are translations of each other according to a bilingual lexicon. In order to perform the matching operation, all paths that correspond to an exhaustive traversal of one of the trees (the source tree) are traversed in the other (the target tree), until a mismatch occurs. In the process, the target tree is augmented with information about the alignments between its paths and those of the source, thus becoming a bilingual suffix tree. FIG. 7 shows two corpora 705, 710, a bilingual lexicon 715, and the corresponding BST 720. Edges drawn with dotted lines mark ends of alignment paths through the tree. Their labels are (unaligned) continuations of the source language substrings from the respective paths.

Since there is a one-to-one correspondence between the substrings in the text and the paths in the suffix trees, the operation described above will yield all pairs of substrings in the two corpora given as input and discover all partial monotone alignments defined by the lexicon.

If the lexicon is probabilistic, each matching between two words will be weighted by the corresponding translation probability. The paths in the resulting bilingual tree will also have weights associated with them, defined as the product of the matching probabilities of the words along the path.

Figure 8:
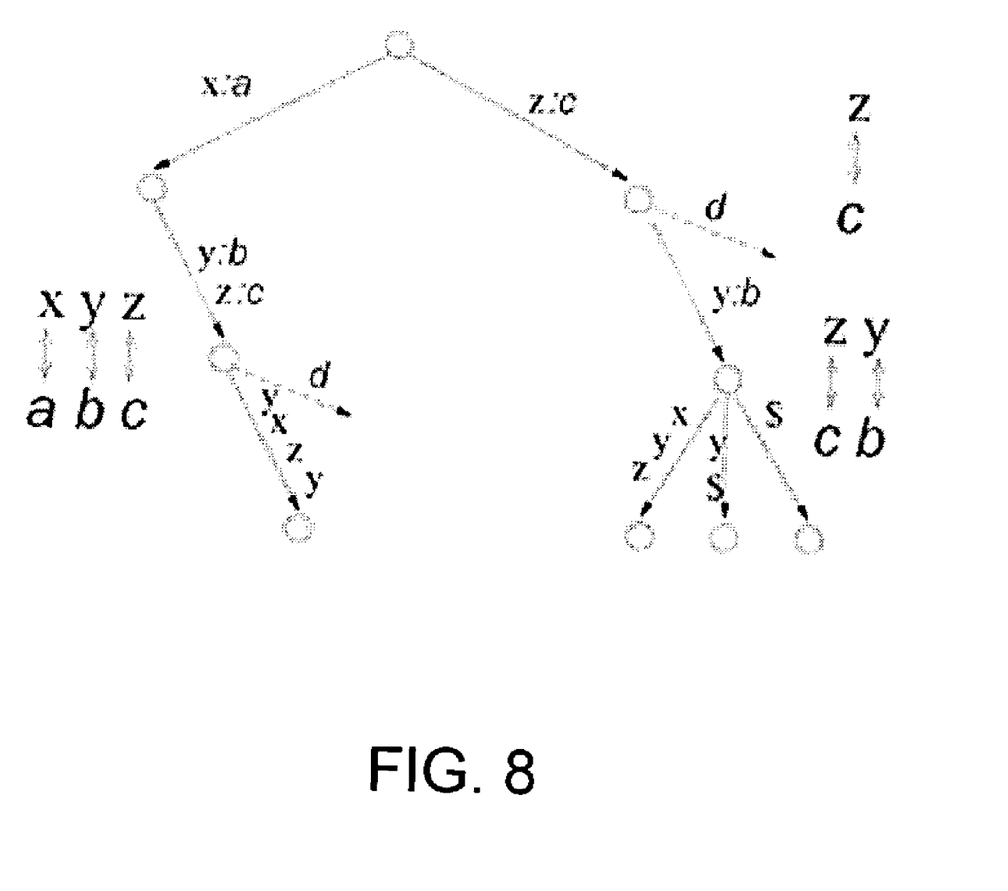
FIG. 8 is a portion of a BST showing example alignments.

BSTs are constructed to encode alignment information, therefore the extraction of parallel phrases amounts to a simple depth-first traversal of the tree. FIG. 8 shows some alignments we can extract from the BST in FIG. 7, a portion of which is shown in FIG. 8.

As can be seen in FIG. 4, there are three types of edge labels in a BST: only target language sequences (e.g., xzy), pairs of target and source language sequences (y:b followed by z:c) and only source language words (b or c). For alignment extraction we are interested in edges of the third type, because they mark ends of alignments. Let e be an edge labeled only with a source language word, originating from node n. A path from the root to n will only traverse edges labeled with word pairs, defining two aligned sequences. The fact that n has outgoing edge e indicates there is a mismatch on the subsequent words of those two sequences. Thus, in order to extract all aligned substrings, the system 400 traverses the BST on edges labeled with word pairs, and extract all paths that end either at the leaves or at nodes that have outgoing edges labeled only with source language words.

Figure 9:
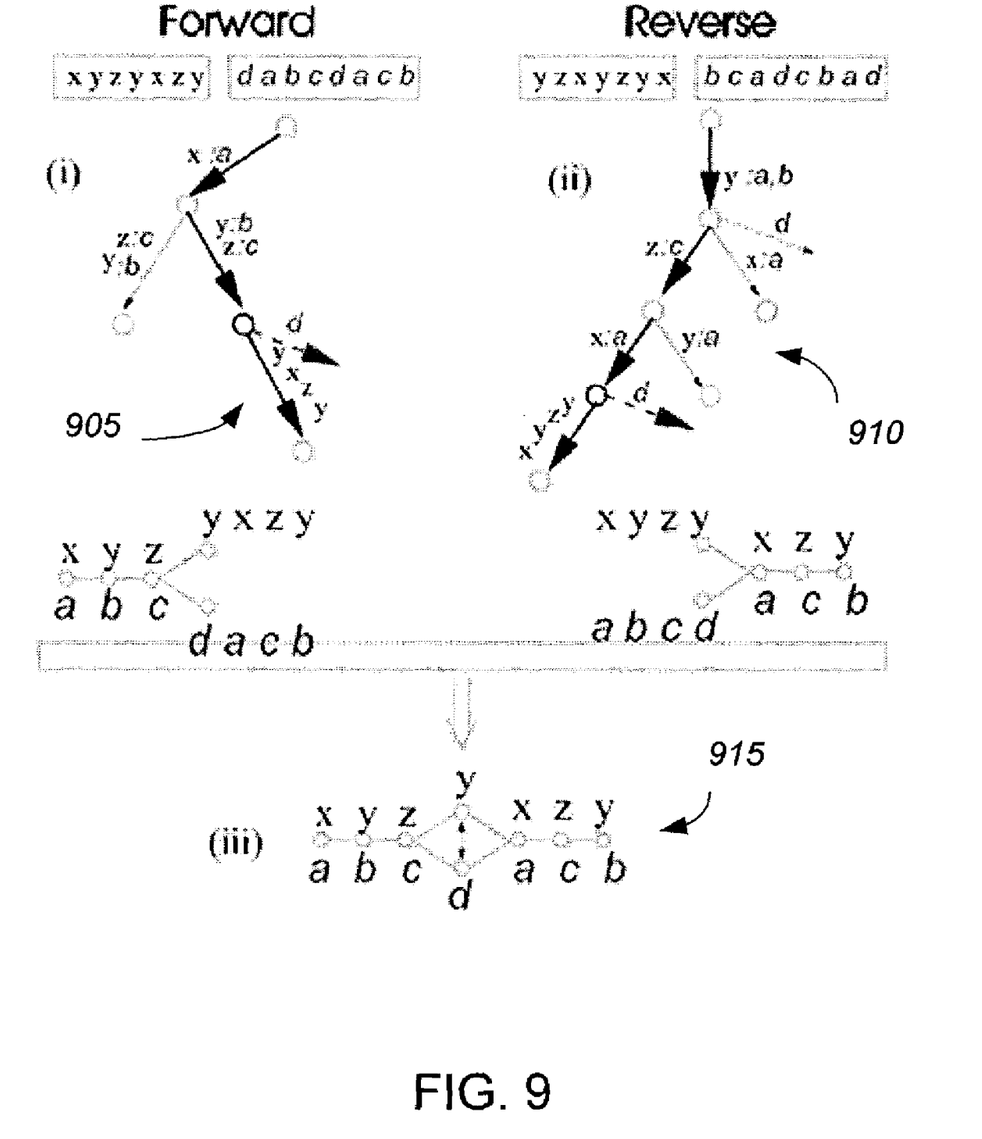
FIG. 9 are portions of a BST describing left and right alignments.

The heuristic by which the system 400 discovers new word translations is shown graphically in FIG. 9. FIG. 9(i) shows a branch 905 of the BST corresponding to the comparable corpus in the same figure. The path defined by the bold edges shows that sequences xyz and abc are aligned, and diverge (i.e., have a mismatch) at characters y and d respectively. This may be taken as a weak indication that d and y are translations of each other. This indication would become stronger if, for example, the sequences following d and y in the two corpora would also be aligned. One way to verify this is to reverse both strings, build a BST for the reversed corpora (a reverse BST), and look for a common path that diverges at the same d and y. FIG. 9(ii) shows the reverse BST 910, and in bold, the path we are interested in. When d and y are surrounded by aligned sequences, we hypothesize that they are translations of each other.

For a pair of words from the two corpora, we use the terms "right alignment" and "left alignment" to refer to the aligned sequences that precede and respectively succeed the two words in each corpus. The left and right alignments and the two words delimited by them make up a context alignment. For example, the left alignment xyz-abc, the right alignment xzy-acb and the words y and d in FIG. 9(iii) make up a context alignment 915.

Given a comparable corpus, this procedure will yield many context alignments which correspond to incorrect translations, such as that between the words "canadien" and "previous":

tout canadien serieux
any previous serious

In order to filter out such cases, the system 400 uses two simple heuristics: length and word content. Thus, for a context alignment to be valid, the left and right context together must contain at least three words, one of which must be an open-class word, e.g., a noun, verb, adjective, or adverb, classes which can have new words added to them. The translation candidate must also be an open-class word. The algorithm 1000 for learning translations of unknown words is summarized in FIG. 10. An advantage of the algorithm over previous approaches is that we do not provide as input to the algorithm a list of unknown words. Instead, the system automatically learns from the corpus both the unknown words and their translation, upon discovery of appropriate context alignments.

The system 400 was tested on an English-French comparable corpus, of approximately 1.3 million words-50.000 sentences for each language. It was obtained by taking two non-parallel, nonaligned segments from the Hansard corpus. The Hansard Corpus includes parallel texts in English and Canadian French, drawn from official records of the proceedings of the Canadian Parliament. A small bilingual lexicon of 6,900 entries was built using 5,000 sentences pairs (150,000 words for each language). The parallel corpus was taken from the Proceedings of the European Parliament (EuroParl) Note that the parallel corpus belongs to a different domain than the comparable corpus. Also the parallel corpus is extremely small. For low density languages, such a corpus can be built manually.

Figure 10:
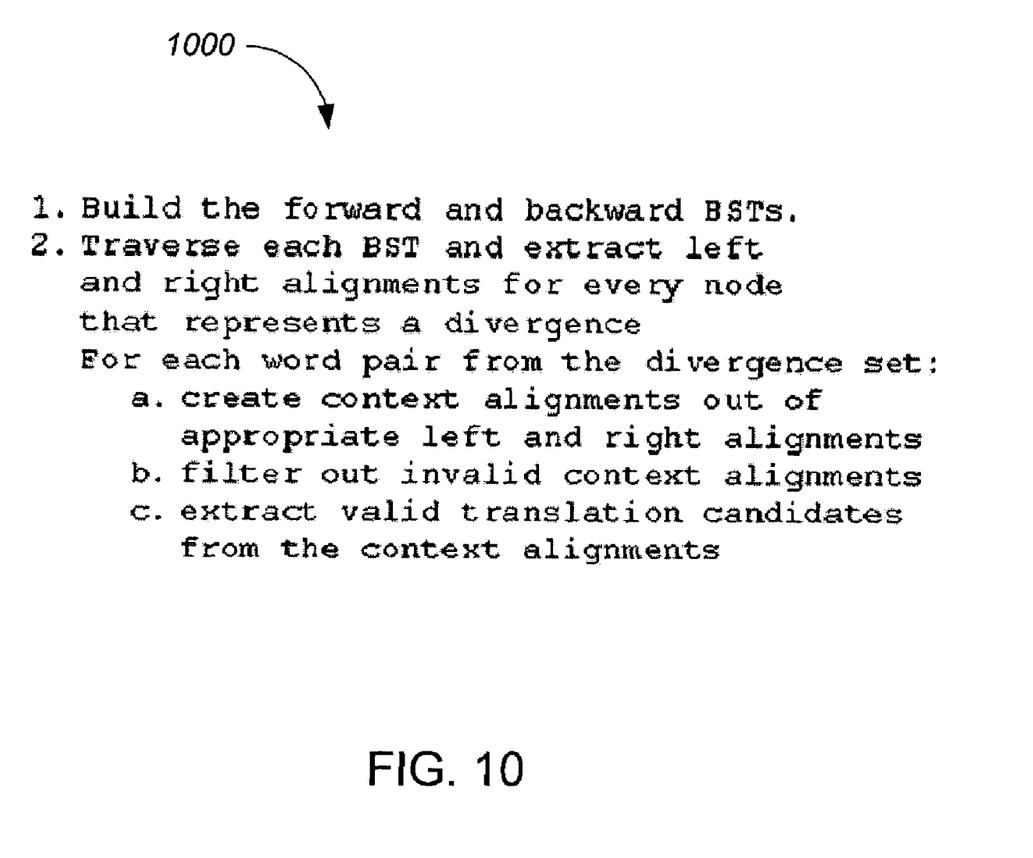
FIG. 10 is pseudocode describing an algorithm for learning translations of unknown words.

When given as input the comparable corpora described above and the bilingual lexicon of 6,900 entries, the algorithm 1000 found 33,926 parallel sequences, with length between three and seven words. Out of 100 randomly selected sequences, 95% were judged to be correct.

The system also found translations for thirty unknown French words. Of these, nine were correct, which means a precision of 30%.

For each of the two corpora, building the monolingual GST took only 1.5 minutes. The matching operation that yields the BST is the most time-consuming: it lasted 38 hours for the forward BST and 60 hours for the reverse BST. The extractions of all parallel phrases and the translations took about 2 hours each. The experiments were run on a Linux® system 400 with an Intel® Pentium® 3 processor of 866 Mhz.

A number of embodiments have been described. Nevertheless, it will be understood that various modifications may be made without departing from the spirit and scope of the invention. For example, blocks in the flowcharts may be skipped or performed out of order and still produce desirable results. Also, the heuristics described in paragraphs 0018-0040 may be combined with the alignment method described in paragraphs 0041-0060. Accordingly, other embodiments are within the scope of the following claims.

The invention claimed is:

1. A method for generating parallel corpora from non-parallel corpora by a machine translation system, the method comprising:
   aligning text segments in two non-parallel corpora accessed by the machine translation system by generating a Bilingual Suffix Tree, the corpora including a source language corpus and a target language corpus;
   traversing the Bilingual Suffix Tree on edges labeled with word pairs;
   extracting paths that end at one of a leaf and a node having outgoing edges labeled only with source language words;
   matching strings in the two non-parallel corpora; and
   generating a parallel corpus stored by the machine translation system, the parallel corpus including the matched strings as translation pairs.

2. The method of claim 1, further comprising:
   generating a Generalized Suffix Tree from the source language corpus;
   generating a Generalized Suffix Tree from the target language corpus; and
   matching strings in said Generalized Suffix Trees.

3. A method for generating parallel corpora from non-parallel corpora by a machine translation system, the method comprising:
   aligning text segments in two non-parallel corpora accessed by the machine translation system, the corpora including a source language corpus and a target language corpus;
   generating a Bilingual Suffix Tree from the two corpora;
   generating a reverse Bilingual Suffix Tree;
   identifying words in the two corpora surrounded by aligned sequences;
   matching strings in the two non-parallel corpora;
   identifying words in the two corpora surrounded by matching strings, one of the words being unknown; and
   generating a parallel corpus stored by the machine translation system, the parallel corpus including the matched strings as translation pairs.

4. An apparatus for generating parallel corpora from non-parallel corpora, the apparatus comprising:
   an alignment module operative when executed by a machine translation system to align text segments in two non-parallel corpora by generating a Bilingual Suffix Tree, to traverse the Bilingual Suffix Tree on edges labeled with word pairs, and to extract paths that end at one of a leaf and a node having outgoing edges labeled only with source language words, the corpora including a source language corpus and a target language corpus; and
   a matching module operative when executed by a machine translation system to match strings in the two non-parallel corpora and to generate a parallel corpus including the matched strings as translation pairs.

5. A computer readable medium having embodied thereon a program, the program being executable by a processor for performing a method for building a translation lexicon from non-parallel corpora, the method comprising:
   aligning text segments in two non-parallel corpora by generating a Bilingual Suffix Tree, the corpora including a source language corpus and a target language corpus;
   traversing the Bilingual Suffix Tree on edges labeled with word pairs;

extracting paths that end at one of a leaf and a node having outgoing edges labeled only with source language words;

matching strings in the two non-parallel corpora; and generating a parallel corpus including the matched strings as translation pairs.

6. The computer readable medium of claim 5, wherein the method further comprises:

generating a Generalized Suffix Tree from the source language corpus;

generating a Generalized Suffix Tree from the target language corpus; and matching strings in said Generalized Suffix Trees.

\* \* \* \* \*

UNITED STATES PATENT AND TRADEMARK OFFICE
CERTIFICATE OF CORRECTION

PATENT NO. : 7,620,538 B2
APPLICATION NO. : 10/401124
DATED : November 17, 2009
INVENTOR(S) : Marcu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Twenty-sixth Day of October, 2010

David J. Kappos
*Director of the United States Patent and Trademark Office*